United States Patent
Amma et al.

(10) Patent No.: US 11,852,815 B2
(45) Date of Patent: Dec. 26, 2023

(54) OPTICAL GLASS, OPTICAL MEMBER, AND OPTICAL DEVICE

(71) Applicant: AGC INC., Tokyo (JP)

(72) Inventors: Shinichi Amma, Tokyo (JP); Tatsuo Nagashima, Tokyo (JP)

(73) Assignee: AGC INC., Tokyo (JP)

( * ) Notice: Subject to any disclaimer, the term of this patent is extended or adjusted under 35 U.S.C. 154(b) by 581 days.

(21) Appl. No.: 16/876,523

(22) Filed: May 18, 2020

(65) Prior Publication Data
US 2020/0278483 A1    Sep. 3, 2020

Related U.S. Application Data

(63) Continuation of application No. PCT/JP2018/038933, filed on Oct. 19, 2018.

(30) Foreign Application Priority Data

Nov. 21, 2017  (JP) .................................. 2017-223586

(51) Int. Cl.
*G02B 27/01*    (2006.01)
*G02C 7/10*    (2006.01)

(52) U.S. Cl.
CPC ......... *G02B 27/0172* (2013.01); *G02C 7/104* (2013.01)

(58) Field of Classification Search
CPC ...... G02B 27/0172; G02C 7/104; C03C 3/14; C03C 3/145; C03C 3/15; C03C 3/155; C03C 3/16; C03C 3/17; C03C 3/21; C03C 3/062; C03C 3/076; C03C 3/078; C03C 3/083; C03C 3/085; C03C 3/095; C03C 3/097
See application file for complete search history.

(56) References Cited

U.S. PATENT DOCUMENTS

| | | | |
|---|---|---|---|
| 10,752,543 B2* | 8/2020 | Shibuya | C03C 15/00 |
| 2010/0079356 A1* | 4/2010 | Hoellwarth | H04B 1/385 |
| | | | 345/8 |
| 2012/0320100 A1 | 12/2012 | Machida et al. | |
| 2013/0300766 A1 | 11/2013 | Mukawa | |

(Continued)

FOREIGN PATENT DOCUMENTS

| | | |
|---|---|---|
| CN | 102830490 A | 12/2012 |
| CN | 105143130 A | 12/2015 |

(Continued)

OTHER PUBLICATIONS

International Searching Authority, "International Search Report," issued in connection with International Patent Application No. PCT/JP2018/038933, dated Jan. 22, 2019.

(Continued)

*Primary Examiner* — George G. King
(74) *Attorney, Agent, or Firm* — Foley & Lardner LLP

(57) ABSTRACT

The present invention relates to an optical glass having refractive index of 1.55 or more and having chromaticity b* that satisfies b*≥4.8 under A light source in a CIELab representation. The present invention also relates to an optical glass having refractive index of 1.55 or more, having a ratio (b*/|a*|) of chromaticity b* to an absolute value of chromaticity a* that satisfies b*/|a*|≥0.55 under A light source in a CIELab representation, and satisfying b*≥0.1.

9 Claims, 2 Drawing Sheets

(56) References Cited

U.S. PATENT DOCUMENTS

| | | |
|---|---|---|
| 2015/0260995 A1 | 9/2015 | Mukawa |
| 2016/0031747 A1* | 2/2016 | Yamamoto .............. C03C 3/091 428/426 |
| 2016/0039709 A1* | 2/2016 | Yamamoto .............. C03C 3/095 501/71 |
| 2017/0069140 A1 | 3/2017 | Mukawa |
| 2018/0211449 A1 | 7/2018 | Mukawa |

FOREIGN PATENT DOCUMENTS

| | | |
|---|---|---|
| JP | 2003-183047 A | 7/2003 |
| JP | 2015-177405 A | 10/2015 |
| JP | 6145966 B2 | 6/2017 |

OTHER PUBLICATIONS

International Searching Authority, "written Opinion," issued in connection with International Patent Application No. PCT/JP2018/038933, dated Jan. 22, 2019.

\* cited by examiner

OPTICAL GLASS, OPTICAL MEMBER, AND OPTICAL DEVICE

CROSS-REFERENCE TO RELATED APPLICATIONS

This is a bypass continuation of PCT Application No. PCT/JP2018/038933, filed on Oct. 19, 2018, which claims priority to Japanese Application No. 2017-223586, filed on Nov. 21, 2017. The contents of these applications are hereby incorporated by reference in their entireties.

TECHNICAL FIELD

The present invention relates to an optical glass, an optical member, and an optical device.

BACKGROUND ART

The glass used for a wearable device such as glasses with projector, glasses-type or goggle-type display, virtual reality and augmented reality display device, and virtual image display device is required to exhibit high strength when the plate thickness of the glass is decreased so as to reduce the weight of the whole device. The method for achieving high strength includes, for example, a method of using a composition having high strength or chemically strengthening the glass.

In such a wearable device, an image generated by an image engine is sometimes guided to an eyeball by guiding light through a transparent body such as glass, and in this case, when the outside world is bright, the image becomes less visible. Accordingly, there is known a technique of combining the optical glass above (silica glass or BK7 (borosilicate glass)) with a dimmable member capable of changing the transmittance according to the brightness of the outside world (see, for example, Patent Literatures 1 and 2).

An optical device obtained by combining such a dimmable member and an optical glass can vary the transmittance of light according to the brightness of the outside world and adjust an image, etc. to an easily viewable brightness. Limitation on the use environment is thereby eliminated to enable usage in a wider range of environments. Among various dimmable members, a dimmable member utilizing an electrochromic is known as a member that provides high transmittance under transmission conditions.

CITATION LIST

Patent Literature

Patent Literature 1: Japanese Patent No. 6,145,966
Patent Literature 2: JP-A-2015-177405

SUMMARY OF INVENTION

Technical Problem

However, the dimmable member utilizing an electrochromic often appears bluish in color at the time of light shielding, although the transmittance can be varied according to the energized state.

As the high-strength optical glass combined with the dimmable member (protective glass), a less-colored glass is generally used. The above-described silica glass or BK7 has a high transmittance in a wide wavelength region from ultraviolet region to infrared region and has transparency that the transmittance in all the visible region is also 80% or more. Consequently, when a wearable device is formed by combining this optical glass with the above-described dimmable member, an image viewed through the wearable device is tinted a bluish color and not in natural color, giving rise to a problem that the color reproducibility of the image is deteriorated.

Furthermore, the optical glass used in the wearable device is required to have high refractive index in terms of, for example, achieving a wide angle and high luminance/high contrast of an image, enhancing the light guide properties, and facilitating the processing of diffraction grating.

The present invention has been invented to solve the above-described problems, and an object thereof is to provide an optical glass which is high refractive index glass and is suitable as a member of a wearable device by improving the color when combined with a dimmable member, and an optical member and an optical device each using the optical glass.

Solution to Problem

An optical glass of the present invention is characterized in that the refractive index is 1.55 or more and the chromaticity b* satisfies b*≥4.8 under A light source in a CIELab representation.

Another optical glass of the present invention is characterized in that the refractive index is 1.55 or more, the ratio (b*/|a*|) of b* to the absolute value of the chromaticity a* under A light source in the CIELab representation satisfies b*/|a*|≥0.55, and b*≥0.1 is satisfied.

The optical member of the present invention is characterized by having a configuration in which the optical glass of the present invention and a dimmable member are stacked together.

Furthermore, the optical device of the present invention is characterized by using the optical member of the present invention.

Advantageous Effects of Invention

The optical glass of the present invention is suitable as an optical glass used in a wearable device due to a refractive index of 1.55 or more and since its chromaticity b* is a predetermined property, in the case of a configuration of being combined with a dimmable member, the outside world when viewed through the configuration can be observed in natural color.

Accordingly, by using this optical glass, an optical member and an optical device each combined with a dimmable member, when fabricated as a wearable device, can be a product having improved color reproducibility of an image.

DESCRIPTION OF EMBODIMENTS

Figure 1:
FIG. 1 is a diagram illustrating a schematic configuration of the optical member of the present invention.

Embodiments of the optical glass, optical member and optical device of the present invention are described below.
[Optical Glass]

First Embodiment

The optical glass of this embodiment has high refractive index ($n_d$) of 1.55 or more. Since the refractive index ($n_d$) is 1.55 or more, the optical glass of this embodiment is suitable as an optical glass used in a wearable device in terms of, for example, achieving wide angle and high luminance/high contrast of an image, enhancing the light guide properties, and facilitating the processing of diffraction grating. The optical glass is suitable as a small imaging glass lens having a wide imaging angle of view used for applications such as in-vehicle camera and robotic vision sensor, because a wide range is photographed by a smaller lens. The refractive index ($n_d$) is preferably 1.60 or more, more preferably 1.65 or more, still more preferably 1.68 or more, yet still more preferably 1.72 or more, even yet still more preferably 1.74 or more, more preferably 1.76 or more, still more preferably 1.78 or more, especially preferably 1.80 or more.

On the other hand, the refractive index ($n_d$) of the optical glass of this embodiment is preferably 2.0 or less. When the refractive index ($n_d$) is 2.0 or less, the density is likely to decrease, the strength tends to be enhanced, the devitrification temperature readily lowers, and therefore, preferable production characteristics are easily obtained. The refractive index ($n_d$) is preferably 1.95 or less, more preferably 1.90 or less, still more preferably 1.85 or less, yet still more preferably 1.81 or less.

In the optical glass of this embodiment, it is preferred that all of the light transmittances wavelengths of 450 nm, 550 nm, 650 nm and 750 nm are 70% or more. Since the light transmittance is 70% or more, the optical glass of this embodiment is suitable as an optical glass used in a wearable device in terms of, for example, achieving high luminance/high contrast of an image and enhancing the light guide properties. The light transmittance is preferably 75% or more, more preferably 80% or more, still more preferably 82% or more, yet still more preferably 85% or more.

The light transmittance as used in the present disclosure is a value measured on the optical glass by means of a spectrophotometer (manufactured by Hitachi High-Technologies Corporation, U-4100).

In the optical glass of this embodiment, the chromaticity b* under A light source in the CIELab representation satisfies b*≥4.8. The chromaticity b* of the optical glass thus satisfies the relationship above, so that when stacked with the later-described dimmable member, the color observed can be improved. More specifically, in the later-described optical member configured by stacking together the optical glass and the dimmable member, both chromaticities $a_C^*$ and $b_C^*$ under A light source in the CIELab representation when shielding the dimmable member from a light approximate 0, and the color when viewing an image, etc. through the optical member represents natural color.

The CIELab representation in this description refers to the CIE 1976 (L*a*b*) color space (CIELAB) standardized by the Commission International de l'Eclairage (CIE). In the present application, the luminosity (L*) for A light source and the chromaticity (a*, b*) of reflected light for A light source apply.

The chromaticity b* of the optical glass is b*≥4.8. Since the chromaticity b* satisfies b*≥4.8, when the dimmable member is set in a light-shielded (colored) state, the color when viewing an image, etc. through an optical member configured by stacking together the optical glass and the dimmable member comes closer to natural color. The chromaticity is preferably b*≥5, more preferably b*≥5.5, still more preferably b*≥6, yet still more preferably b*≥7, even yet still more preferably b*≥8, and particularly preferably b*≥10.

In addition, the chromaticity b* of the optical glass is preferably b*≤15. Since the chromaticity b* satisfies b*≤15, when the dimmable member is set in a light-shielded (colored) state, the color when viewing an image, etc. through an optical member configured by stacking together the optical glass and the dimmable member comes closer to natural color. The chromaticity b* of the optical glass is preferably b*≤14, more preferably b*≤13, still more preferably b*≤12, yet still more preferably b*≤11.

The optical glass of this embodiment is used by stacking it with the later-described dimmable member, and by being used in such a stacked manner, the color of an image, etc. observed can be recognized as natural color.

Furthermore, in view of ease of production and enhancement in strength, the optical glass of this embodiment preferably has the following properties.

The Tg of the optical glass of this embodiment is preferably 800° C. or less. When the optical glass of this embodiment has Tg in the range above, the moldability in press molding and redraw forming is good. The Tg is more preferably 760° C. or less, still more preferably 720° C. or less, yet still more preferably 680° C. or less, especially preferably 640° C. or less.

Tg of the optical glass of this embodiment is preferably 500° C. or more. When the optical glass of this embodiment has Tg in the range above, deflection is prevented when the glass is subjected to the high temperature process. The Tg is more preferably 520° C. or more, still more preferably 540° C. or more, yet still more preferably 560° C. or more, especially preferably 580° C. or more.

Tg of the optical glass can be determined, for example, by a known method such as thermal expansion method.

The Young's modulus (E) of the optical glass of this embodiment is preferably 60 GPa or more. Having such a property is advantageous in that when the optical glass is used as a thin glass plate for a wearable device or used as a lens for an in-vehicle camera, robotic vision sensor, etc., deflection is less likely to occur.

From the viewpoint of reducing the deflection amount of the glass, the E is more preferably 70 GPa or more, still more preferably 80 GPa or more, yet still more preferably 85 GPa or more, especially preferably 90 GPa or more. The Young's modulus (E) of the optical glass of this embodiment is preferably 140 GPa or less. When the glass has such a property, deflection amount when the glass is conveyed by a roller etc. is reduced, and trouble such as breakage is reduced. From the viewpoint of making the glass resistant to breakage, the E is more preferably 120 GPa or less, still more preferably 100 GPa or less, yet still more preferably 95 GPa or less, especially preferably 90 GPa or less.

The coefficient of thermal expansion ($\alpha$) at 50 to 350° C. of the optical glass of this embodiment is preferably 50 ($\times 10^{-7}$/K) or more. When the optical glass of this embodiment has a in the range above, the expansion matching to peripheral members is good. The $\alpha$ is more preferably 60 ($\times 10^{-7}$/K) or more, still more preferably 70 ($\times 10^{-7}$/K) or more, yet still more preferably 80 ($\times 10^{-7}$/K) or more, especially preferably 90 ($\times 10^{-7}$/K) or more.

The α of the optical glass of this embodiment is preferably 150 ($\times 10^{-7}$/K) or less. When the optical glass of this embodiment has α in the range above, breakage during cooling is less likely to occur. The α is more preferably 120 ($\times 10^{-7}$/K) or more, still more preferably 110 ($\times 10^{-7}$/K) or less, yet still more preferably 100 ($\times 10^{-7}$/K) or less, especially preferably 95 ($\times 10^{-7}$/K) or less.

The optical glass of this embodiment is preferably a glass plate having a thickness of 0.01 mm or more. When the thickness is 0.01 mm or more, deflection due to its own weight of the optical glass is prevented. The thickness is more preferably 0.1 mm or more, still more preferably 0.3 mm or more, yet still more preferably 0.5 mm or more, especially preferably 0.7 mm or more. On the other hand, when the thickness is 2.0 mm or less, the weight of the whole optical glass is easily reduced. The thickness is more preferably 1.5 mm or less, still more preferably 1.0 mm or less, yet still more preferably 0.8 mm or less, especially preferably 0.6 mm or less.

The optical glass of this embodiment is preferably in glass plate shape. In the case of a glass plate, the area of one main surface thereof is preferably 8 cm$^2$ or more. When the area is 8 cm$^2$ or more, a large number of optical elements can be disposed, and the productivity is enhanced. The area is more preferably 30 cm$^2$ or more, still more preferably 170 cm$^2$ or more, yet still more preferably 300 cm$^2$ or more, especially preferably 1,000 cm$^2$ or more. On the other hand, when the area is 6,500 cm$^2$ or less, handling of the glass plate is facilitated, and the breakage during handling or processing of the glass plate can be prevented. The area is more preferably 4,500 cm$^2$ or less, still more preferably 4,000 cm$^2$ or less, yet still more preferably 3,000 cm$^2$ or less, especially preferably 2,000 cm$^2$ or less.

The surface roughness Ra of one main surface of the optical glass of this embodiment is preferably 2 nm or less. When Ra is in this range, a nanostructure having the desired shape can be formed on one main surface by using imprint technology, etc., and desired light guide properties are also obtained. Ra is more preferably 1.7 nm or less, still more preferably 1.4 nm or less, yet still more preferably 1.2 nm or less, especially preferably 1.0 nm or less. Here, the surface roughness Ra is an arithmetic mean roughness defined in JIS B0601 (2001). In this description, the surface area is a value obtained by measuring three different areas of 10 μm×10 μm by means of an atomic force microscope (AFM) and averaging the results.

[Glass Components]

One embodiment of the composition range of each component that can be contained in the optical glass of this embodiment is described in detail below. In this description, unless otherwise indicated, the content of each component is represented by mass % relative to the total mass of the glass matrix composition based on oxides. Here, the glass matrix composition are components excluding $Sb_2O_3$ and $SnO_2$.

The matrix composition satisfying the properties of high refractive index, good light transmittance and high meltability in the optical glass of this embodiment includes, for example, a composition containing, in mass % based on oxides, as the glass forming component, from 5 to 80 mass % of at least one selected from the group consisting of $SiO_2$, $B_2O_3$ and $P_2O_5$, as the modifier oxide, 5 to 70 mass % in a total amount of at least one oxide selected from the group consisting of MgO, CaO, SrO, BaO, ZnO, $Li_2O$, $Na_2O$, $K_2O$, $Cs_2O$ and $Ln_2O_3$ (Ln is at least one selected from the group consisting of Y, La, Gd, Yb and Lu), and as the intermediate oxide, 0 to 50 mass % in a total amount of at least one oxide selected from the group consisting of $Al_2O_3$, $TiO_2$, $ZrO_2$, $WO_3$, $Bi_2O_3$, $TeO_2$, $Ta_2O_5$ and $Nb_2O_5$.

Examples of the optical glass having such a composition include, specifically, (1) an La—B-based optical glass, (2) an $SiO_2$-based optical glass, and (3) a $P_2O_5$-based optical glass. In the description of contents in the glass composition, simple expressions "%" and "ppm" mean "mass %" and "ppm by mass" unless specifically stated.

Examples of (1) the La—B-based optical glass include a glass containing from 5 to 70% of $La_2O_3$ and from 5 to 70% of $B_2O_3$ assuming the total of the matrix composition is 100%.

By containing 5% or more of $La_2O_3$ component, desired high refractive index can be achieved, and the dispersion can be reduced (the Abbe number can be increased). Accordingly, the lower limit of the content of $La_2O_3$ component is preferably 10%, more preferably 15%, still more preferably 20%, yet still more preferably 30%.

On the other hand, when the content of $La_2O_3$ component is 70% or less, reduction in the meltability of the glass is prevented, and the devitrification resistance of the glass is enhanced. Accordingly, the upper limit of the content of $La_2O_3$ component is preferably 60%, more preferably 50%, still more preferably 40%, yet still more preferably 30%.

$B_2O_3$ is a glass forming component, and the $B_2O_3$ content is preferably from 5 to 70% assuming the total of the matrix composition is 100%.

By containing 5% or more of $B_2O_3$ component, the devitrification resistance of the glass is enhanced, and the dispersion of the glass can be reduced. Accordingly, the lower limit of the content of $B_2O_3$ component is preferably 10%, more preferably 20%, still more preferably 35%.

On the other hand, when the content of $B_2O_3$ component is 70% or less, a larger refractive index can be readily obtained, and deterioration of the chemical durability can be prevented. Accordingly, the upper limit of the content of $B_2O_3$ component is preferably 60%, more preferably 50%, still more preferably 40%, yet still more preferably 30%.

MgO is an optional component. The MgO content is preferably from 0 to 20% assuming the total of the matrix composition is 100%. By containing the MgO component, the mechanical strength of the glass can be enhanced. The MgO content is more preferably 1% or more, still more preferably 3% or more, yet still more preferably 5% or more, especially preferably 8% or more. When the MgO content is 20% or less, the devitrification temperature is lowered, and preferable production characteristics are obtained. The MgO content is more preferably 15% or less, still more preferably 10% or less, yet still more preferably 5% or less, especially preferably 3% or less.

CaO is an optional component. The CaO content is preferably from 0 to 30% assuming the total of the matrix composition is 100%. By containing the CaO component, the chemical durability of the glass can be enhanced. The CaO content is more preferably 1% or more, still more preferably 3% or more, yet still more preferably 5% or more, especially preferably 10% or more. When the CaO content is 30% or less, the devitrification temperature is lowered, and preferable production characteristics are obtained. The CaO content is more preferably 20% or less, still more preferably 15% or less, yet still more preferably 10% or less, especially preferably 5% or less.

SrO is an optional component. The SrO content is preferably from 0 to 30% assuming the total of the matrix composition is 100%. By containing the SrO component, the refractive index of the glass can be increased. The SrO content is more preferably 1% or more, still more preferably 3% or more, yet still more preferably 5% or more, especially preferably 10% or more. When the SrO content is 30% or less, the devitrification temperature is lowered, and preferable production characteristics are obtained. The SrO content is more preferably 20% or less, still more preferably 15% or less, yet still more preferably 10% or less, especially preferably 5% or less.

BaO is an optional component. The BaO content is preferably from 0 to 40% assuming the total of the matrix composition is 100%. By containing the BaO component, the refractive index of the glass can be increased. The BaO content is more preferably 1% or more, still more preferably 3% or more, yet still more preferably 5% or more, especially preferably 10% or more. When the BaO content is 40% or less, the devitrification temperature is lowered, and preferable production characteristics are obtained. The BaO content is more preferably 30% or less, still more preferably 20% or less, yet still more preferably 15% or less, especially preferably 10% or less.

ZnO is an optional component. The ZnO content is preferably from 0 to 30% assuming the total of the matrix composition is 100%. By containing the ZnO component, the refractive index of the glass can be increased. The ZnO content is more preferably 1% or more, still more preferably 3% or more, yet still more preferably 5% or more, especially preferably 10% or more. When the ZnO content is 30% or less, the devitrification temperature is lowered, and preferable production characteristics are obtained. The ZnO content is more preferably 20% or less, still more preferably 15% or less, yet still more preferably 10% or less, especially preferably 5% or less.

$Li_2O$ is an optional component. The $Li_2O$ content is preferably from 0 to 15% assuming the total of the matrix composition is 100%. When $Li_2O$ is contained, the strength (Kc) and crack resistance (CIL) can be enhanced. The $Li_2O$ content is more preferably 0.5% or more, still more preferably 1% or more, yet still more preferably 3% or more, especially preferably 5% or more. On the other hand, when the $Li_2O$ content is 15% or less, the devitrification temperature is lowered, and preferable production characteristics are obtained. The $Li_2O$ content is preferably 10% or less, more preferably 7% or less, still more preferably 5% or less, especially preferably 4% or less.

$Na_2O$ is an optional component. The $Na_2O$ content is from 0 to 20% assuming the total of the matrix composition is 100%. When the $Na_2O$ content is 20% or less, good crack resistance is obtained. The $Na_2O$ content is preferably 15% or less, more preferably 10% or less, still more preferably 7% or less, especially preferably 5% or less. In the case where the optical glass of this embodiment contains $Na_2O$, the devitrification temperature is lowered, and preferable production characteristics are obtained. The content thereof is preferably 0.5% or more, more preferably 1% or more, still more preferably 2% or more, especially preferably 3% or more.

$K_2O$ is an optional component. The $K_2O$ content is from 0 to 20% assuming the total of the matrix composition is 100%. When the $K_2O$ content is 20% or less, good crack resistance is obtained. The $K_2O$ content is preferably 15% or less, more preferably 10% or less, still more preferably 7% or less. In the case where the optical glass of this embodiment contains $K_2O$, the devitrification temperature is lowered, and preferable production characteristics are obtained. The content thereof is preferably 0.5% or more, more preferably 1% or more, still more preferably 2% or more, especially preferably 3% or more.

The optical glass of this embodiment can contain, as an optional component, alkali metal components ($Li_2O+Na_2O+K_2O$). The content of $Li_2O+Na_2O+K_2O$ is from 0 to 20% assuming the total of the matrix composition is 100%. When $Li_2O+Na_2O+K_2O$ is 2% or more, $T_2$ at which the viscosity of the glass is log $\eta=2$ is readily lowered, the melting temperature is low, and coloration is controlled. The content of $Li_2O+Na_2O+K_2O$ is preferably 4% or more, more preferably 6% or more, still more preferably 8% or more, especially preferably 10% or more. When the content of $Li_2O+Na_2O+K_2O$ is 20% or less, the devitrification temperature is lowered, and preferable production characteristics are obtained. The content of $Li_2O+Na_2O+K_2O$ is preferably 15% or less, more preferably 10% or less, still more preferably 8% or less, especially preferably 6% or less.

In the optical glass of this embodiment, among alkali metal components ($Li_2O$, $Na_2O$, $K_2O$), $Li_2O$ is a component capable of enhancing the strength of the glass, but if its amount is too large, $T_2$ is readily lowered, and devitrification is likely to occur. Accordingly, in the optical glass of this embodiment, the value of the ratio $Li_2O/(Li_2O+Na_2O+K_2O)$ is preferably 0.45 or less in mass % based on oxides. When $Li_2O/(Li_2O+Na_2O+K_2O)$ is 0.45 or less, $T_2$ is likely to be high, devitrification is less likely to occur, and ease of formability of the glass is enhanced. $Li_2O/(Li_2O+Na_2O+K_2O)$ is more preferably 0.4 or less, still more preferably 0.35 or less, especially preferably 0.3 or less.

$Cs_2O$ is an optional component. The $Cs_2O$ content is preferably from 0 to 20% assuming the total of the matrix composition is 100%. When the $Cs_2O$ content is more than 0%, the devitrification temperature is lowered, and preferable production characteristics are obtained. In the case where the optical glass of this invention contains $Cs_2O$, its content is preferably 0.5% or more, more preferably 1% or more, still more preferably 2% or more, especially preferably 3% or more. On the other hand, when the $Cs_2O$ content is 20% or less, good crack resistance is obtained. The $Cs_2O$ content is preferably 15% or less, more preferably 10% or less, still more preferably 7% or less.

$Ln_2O_3$ (Ln is at least one selected from the group consisting of Y, La, Gd, Yb and Lu) is an optional component. The content in terms of the total amount of $Ln_2O_3$ is from 0 to 55% assuming the total of the matrix composition is 100%. When $Ln_2O_3$ is contained, the refractive index of the glass can be increased. The content in terms of the total amount of $Ln_2O_3$ is preferably 1% or more, more preferably 5% or more, still more preferably 10% or more, especially preferably 15% or more.

When the $Ln_2O_3$ content is 55% or less, the devitrification temperature can be lowered, and the raw material cost can be reduced. Accordingly, the content in terms of the total amount is preferably 55% or less, more preferably 25% or less, still more preferably 15% or less, especially preferably 10% or less.

$Al_2O_3$ is an optional component. The $Al_2O_3$ content is from 0 to 55% assuming the total of the matrix composition is 100%. When $Al_2O_3$ is contained, the strength of the glass can be increased, and the stability of the glass can be enhanced. The $Al_2O_3$ content is preferably 1% or more, more preferably 3% or more, still more preferably 5% or more, especially preferably 8% or more.

When the $Al_2O_3$ content is 55% or less, the devitrification temperature is lowered, and preferable production characteristics are obtained. The $Al_2O_3$ content is preferably 15% or less, and it is preferred to have an $Al_2O_3$ content of 10% or less, furthermore, an $Al_2O_3$ content of 8% or less, particularly, an $Al_2O_3$ content of 5% or less.

$TiO_2$ is an optional component. The $TiO_2$ content is from 0 to 55% assuming the total of the matrix composition is 100%. When $TiO_2$ is contained, the refractive index of the glass can be increased, and the stability of the glass can be enhanced. $TiO_2$ is a component coloring the glass, and can be contained to increase b* and to obtain the desirable chromaticity. The $TiO_2$ content is preferably 1% or more, more preferably 5% or more, still more preferably 10% or more, especially preferably 15% or more.

When the $TiO_2$ content is 55% or less, the devitrification temperature is lowered, and coloration of the glass is controlled. The $TiO_2$ content is preferably 35% or less, more preferably 25% or less, still more preferably 15% or less, especially preferably 10% or less.

$ZrO_2$ is an optional component. The $ZrO_2$ content is from 0 to 55% assuming the total of the matrix composition is 100%. When $ZrO_2$ is contained, the refractive index of the glass can be increased, and the chemical durability can be enhanced. The $ZrO_2$ content is preferably 1% or more, more preferably 5% or more, still more preferably 10% or more, especially preferably 15% or more.

When the $ZrO_2$ content is 55% or less, the devitrification temperature is lowered, and preferable production characteristics are obtained. The $ZrO_2$ content is preferably 30% or less, more preferably 20% or less, still more preferably 15% or less, especially preferably 10% or less.

$WO_3$ is an optional component. The $WO_3$ content is from 0 to 55% assuming the total of the matrix composition is 100%. When $WO_3$ is contained, the refractive index of the glass can be increased. $WO_3$ is a component coloring the glass, and can be contained to increase b* and to obtain the desirable chromaticity. The $WO_3$ content is preferably 1% or more, more preferably 3% or more, still more preferably 5% or more, especially preferably 10% or more.

When the $WO_3$ content is 55% or less, the devitrification temperature is lowered, and coloration of the glass is controlled. The $WO_3$ content is preferably 30% or less, more preferably 20% or less, still more preferably 15% or less, especially preferably 10% or less.

$Bi_2O_3$ is an optional component. The $Bi_2O_3$ content is from 0 to 55% assuming the total of the matrix composition is 100%. When $Bi_2O_3$ is contained, the refractive index of the glass can be increased. $Bi_2O_3$ is a component coloring the glass, and can be contained to increase b* and to obtain the desirable chromaticity. The $Bi_2O_3$ content is preferably 1% or more, more preferably 5% or more, especially preferably 10% or more.

When the $Bi_2O_3$ content is 55% or less, the devitrification temperature is lowered, and coloration of the glass can is controlled. The $Bi_2O_3$ content is preferably 35% or less, more preferably 25% or less, still more preferably 15% or less, especially preferably 10% or less.

$TeO_2$ is an optional component. The $TeO_2$ content is from 0 to 30% assuming the total of the matrix composition is 100%. When $TeO_2$ is contained, the refractive index of the glass can be increased. The $TeO_2$ content is preferably 1% or more, more preferably 5% or more, still more preferably 10% or more, especially preferably 15% or more.

When the $TeO_2$ content is 55% or less, the devitrification temperature can be lowered and moreover, the material cost can be reduced. The $TeO_2$ content is preferably 30% or less, more preferably 20% or less, still more preferably 15% or less, especially preferably 10% or less.

$Ta_2O_5$ is an optional component. The $Ta_2O_5$ content is from 0 to 30% assuming the total of the matrix composition is 100%. When $Ta_2O_5$ is contained, the refractive index of the glass can be increased. The $Ta_2O_5$ content is preferably 1% or more, more preferably 5% or more, still more preferably 10% or more, especially preferably 15% or more.

When the $Ta_2O_5$ content is 30% or less, the devitrification temperature can be lowered and moreover, the material cost can be reduced. The $Ta_2O_5$ content is preferably 25% or less, more preferably 20% or less, still more preferably 15% or less, especially preferably 10% or less.

$Nb_2O_5$ is an optional component. The $Nb_2O_5$ content is from 0 to 55% assuming the total of the matrix composition is 100%. When $Nb_2O_5$ is contained, the refractive index of the glass can be increased. $Nb_2O_5$ is a component coloring the glass, and can be contained to increase b* and to obtain the desirable chromaticity. The $Nb_2O_5$ content is preferably 5% or more, more preferably 10% or more, still more preferably 15% or more, especially preferably 30% or more.

When the $Nb_2O_5$ content is 55% or less, the devitrification temperature can be lowered and moreover, the material cost can be reduced. The $Nb_2O_5$ content is preferably 35% or less, more preferably 25% or less, still more preferably 15% or less, especially preferably 10% or less.

Examples of (2) the $SiO_2$-based optical glass include a glass containing from 10 to 70% of $SiO_2$ and containing, as the high refractive index component, 1% or more of at least one selected from the group consisting of $Nb_2O_5$, $Ta_2O_5$, $Li_2O$, SrO, BaO, $TiO_2$, $ZrO_2$, $WO_3$, $Bi_2O_3$, $TeO_2$ and $Ln_2O_3$ (Ln is at least one selected from the group consisting of Y, La, Gd, Yb and Lu).

$SiO_2$ is a glass forming component. The $SiO_2$ content is from 10 to 70% assuming the total of the matrix composition is 100%. When the $SiO_2$ content is 10% or more, the viscosity of the glass can let the temperature $T_2$ at which log $\eta=2$ be in the preferred range, high strength and crack resistance are imparted to the glass, and the stability and chemical durability of the glass can be enhanced. The $SiO_2$ content is preferably 15% or more, more preferably 20% or more, still more preferably 25% or more. On the other hand, when the $SiO_2$ content is 70% or less, a component for obtaining high refractive index can be contained. The $SiO_2$ content is preferably 60% or less, more preferably 50% or less, still more preferably 40% or less.

$Nb_2O_5$ is an optional component. When the $Nb_2O_5$ content is 5% or more assuming the total of the matrix composition is 100%, the refractive index of the glass can be increased and the Abbe number ($v_d$) can be reduced. $Nb_2O_5$ is a component coloring the glass, and can be contained to increase b* and to obtain the desirable chromaticity. The $Nb_2O_5$ content is more preferably 15% or more, still more preferably 25% or more, especially preferably 30% or more.

When the $Nb_2O_5$ content is 70% or less, the devitrification temperature can be lowered and moreover, the raw material cost can be reduced. The $Nb_2O_5$ content is preferably 60% or less, more preferably 55% or less, still more preferably 50% or less.

$Ta_2O_5$ is an optional component. The $Ta_2O_5$ content is from 0 to 30% assuming the total of the matrix composition is 100%. When the $Ta_2O_5$ content is 1% or more, the refractive index can be increased. The $Ta_2O_5$ content is more preferably 5% or more, still more preferably 10% or more, especially preferably 15% or more.

When the $Ta_2O_5$ content is 30% or less, the devitrification temperature can be lowered and moreover, the raw material cost can be reduced. The $Ta_2O_5$ content is preferably 25% or less, more preferably 20% or less, still more preferably 15% or less, especially preferably 10% or less.

The optical glass of this embodiment can contain, as an optional component, alkali metal components ($Li_2O+Na_2O+K_2O$). The content of $Li_2O+Na_2O+K_2O$ is from 0 to 20% assuming the total of the matrix composition is 100%. When $Li_2O+Na_2O+K_2O$ is 2% or more, $T_2$ is readily lowered, the melting temperature is low, and coloration is controlled. The content of $Li_2O+Na_2O+K_2O$ is preferably 4% or more, more preferably 6% or more, still more preferably 8% or more, especially preferably 10% or more. When the content of $Li_2O+Na_2O+K_2O$ is 20% or less, the devitrification temperature is lowered, and preferable production characteristics are obtained. The content of $Li_2O+Na_2O+K_2O$ is preferably 15% or less, more preferably 10% or less, still more preferably 8% or less, especially preferably 6% or less.

In the optical glass of this embodiment, among alkali metal components ($Li_2O$, $Na_2O$, $K_2O$), $Li_2O$ is a component capable of enhancing the strength of the glass, but if its amount is too large, $T_2$ is readily lowered, and devitrification is likely to occur. Accordingly, in the optical glass of this embodiment, the value of the ratio $Li_2O/(Li_2O+Na_2O+K_2O)$ is preferably 0.45 or less in mass % based on oxides. When $Li_2O/(Li_2O+Na_2O+K_2O)$ is 0.45 or less, $T_2$ is likely to be high, devitrification is less likely to occur, and ease of formability of the glass is enhanced. $Li_2O/(Li_2O+Na_2O+K_2O)$ is more preferably 0.4 or less, still more preferably 0.35 or less, especially preferably 0.3 or less.

$Li_2O$ is an optional component. The $Li_2O$ content is preferably from 0 to 15% assuming the total of the matrix composition is 100%. When $Li_2O$ is contained, the strength (Kc) and crack resistance (CIL) can be enhanced. The $Li_2O$ content is more preferably 0.5% or more, still more preferably 1% or more, yet still more preferably 3% or more, especially preferably 5% or more. On the other hand, when the $Li_2O$ content is 15% or less, the devitrification temperature is lowered, and preferable production characteristics are obtained. The $Li_2O$ content is preferably 10% or less, more preferably 7% or less, still more preferably 5% or less, especially preferably 4% or less.

SrO is an optional component. The SrO content is preferably from 0 to 30% assuming the total of the matrix composition is 100%. By containing the SrO component, the refractive index of the glass can be increased. The SrO content is more preferably 1% or more, still more preferably 3% or more, yet still more preferably 5% or more, especially preferably 10% or more. When the content is 30% or less, the devitrification temperature is lowered, and preferable production characteristics are obtained. The SrO content is more preferably 20% or less, still more preferably 15% or less, yet still more preferably 10% or less, especially preferably 5% or less.

BaO is an optional component. The BaO content is preferably from 0 to 50% assuming the total of the matrix composition is 100%. By containing the BaO component, the refractive index of the glass can be increased. The content is more preferably 1% or more, still more preferably 3% or more, yet still more preferably 5% or more, especially preferably 10% or more. When the content is 50% or less, the devitrification temperature is lowered, and preferable production characteristics are obtained. The BaO content is more preferably 35% or less, still more preferably 20% or less, yet still more preferably 15% or less, especially preferably 10% or less.

$TiO_2$ is an optional component. The $TiO_2$ content is from 0 to 55% assuming the total of the matrix composition is 100%. When $TiO_2$ is contained, the refractive index of the glass can be increased, and the stability of the glass can be enhanced. $TiO_2$ is a component coloring the glass, and can be contained to increase b* and to obtain the desirable chromaticity. The $TiO_2$ content is preferably 1% or more, more preferably 5% or more, still more preferably 10% or more, especially preferably 15% or more.

When the $TiO_2$ content is 55% or less, the devitrification temperature is lowered, and coloration of the glass is controlled. The $TiO_2$ content is preferably 35% or less, more preferably 25% or less, still more preferably 15% or less, especially preferably 10% or less.

$ZrO_2$ is an optional component. The $ZrO_2$ content is from 0 to 55% assuming the total of the matrix composition is 100%. When $ZrO_2$ is contained, the refractive index of the glass can be increased, and the chemical durability can be enhanced. The $ZrO_2$ content is preferably 1% or more, more preferably 5% or more, still more preferably 10% or more, especially preferably 15% or more.

When the $ZrO_2$ content is 55% or less, the devitrification temperature is lowered, and preferable production characteristics are obtained. The $ZrO_2$ content is preferably 30% or less, more preferably 20% or less, still more preferably 15% or less, especially preferably 10% or less.

$WO_3$ is an optional component. The $WO_3$ content is from 0 to 55% assuming the total of the matrix composition is 100%. When $WO_3$ is contained, the refractive index of the glass can be increased. $WO_3$ is a component coloring the glass, and can be contained to increase b* and to obtain the desirable chromaticity. The $WO_3$ content is preferably 1% or more, more preferably 3% or more, still more preferably 5% or more, especially preferably 10% or more.

When the $WO_3$ content is 55% or less, the devitrification temperature is lowered, and coloration of the glass is controlled. The $WO_3$ content is preferably 30% or less, more preferably 20% or less, still more preferably 15% or less, especially preferably 10% or less.

$Bi_2O_3$ is an optional component. The $Bi_2O_3$ content is from 0 to 55% assuming the total of the matrix composition is 100%. When $Bi_2O_3$ is contained, the refractive index of the glass can be increased. $Bi_2O_3$ is a component coloring the glass, and can be contained to increase both a* and b* and to obtain the desirable chromaticity. The $Bi_2O_3$ content is preferably 1% or more, more preferably 5% or more, still more preferably 5% or more, especially preferably 10% or more.

When the $Bi_2O_3$ content is 55% or less, the devitrification temperature is lowered, and coloration of the glass can is controlled. The $Bi_2O_3$ content is preferably 35% or less, more preferably 25% or less, still more preferably 15% or less, especially preferably 10% or less.

$TeO_2$ is an optional component. The $TeO_2$ content is from 0 to 30% assuming the total of the matrix composition is 100%. When $TeO_2$ is contained, the refractive index of the glass can be increased. The $TeO_2$ content is preferably 1% or more, more preferably 5% or more, still more preferably 10% or more, especially preferably 15% or more.

When the $TeO_2$ content is 55% or less, the devitrification temperature can be lowered and moreover, the material cost can be reduced. The $TeO_2$ content is preferably 30% or less, more preferably 20% or less, still more preferably 15% or less, especially preferably 10% or less.

By containing $Ln_2O_3$ (Ln is one or more selected from the group consisting of Y, La, Gd, Yb and Lu), the refractive index of the glass can be increased. The $Ln_2O_3$ content is preferably 1% or more, more preferably 3% or more, still more preferably 5% or more, especially preferably 10% or more. On the other hand, when the $Ln_2O_3$ content is 55% or less assuming the total of the matrix composition is 100%, the devitrification temperature is lowered, and preferable production characteristics are obtained. The $Ln_2O_3$ content is in total preferably 35% or less, more preferably 20% or less, especially preferably 15% or less.

Examples of (3) the $P_2O_5$-based optical glass include a glass containing from 10 to 70 mass % of $P_2O_5$ and containing, as the high refractive index component, 1% or more of at least one selected from the group consisting of $Nb_2O_5$, $Ta_2O_5$, $Li_2O$, SrO, BaO, $TiO_2$, $ZrO_2$, $WO_3$, $Bi_2O_3$, $TeO_2$ and $Ln_2O_3$ (Ln is at least one selected from the group consisting of Y, La, Gd, Yb and Lu).

$P_2O_5$ is a glass forming component constituting the glass, and its action of imparting producible stability to the glass and reducing the glass transition temperature and liquid phase temperature is large. However, if the $P_2O_5$ content is less than 10% assuming the total of the matrix composition is 100%, sufficient effects are not obtained. The $P_2O_5$ content is preferably 15% or more, more preferably 20% or more, still more preferably 30% or more, especially preferably 40% or more. In addition, when the $P_2O_5$ content is 70% or less, good chemical durability is obtained. The $P_2O_5$ content is preferably 65% or less, more preferably 60% or less, still more preferably 55% or less, especially preferably 50% or less.

The high-refractive-index component is the same as that of (2) $SiO_2$ above and therefore, description thereof is omitted.

In the optical glass of this embodiment, a colored component can also be blended in the matrix composition in order for the optical glass to satisfy the above-described chromaticity b*. The colored component used here includes elements such as Fe, Cr, Ni and Pt, and the element is contained as a simple substance, an ion, or a compound such as oxide.

Fe is a component that colors the glass, and this can be contained to obtain favorable chromaticity by increasing b*. The content of Fe is preferably 2 ppm by mass or more, more preferably 5 ppm by mass or more, still more preferably 10 ppm by mass or more, yet still more preferably 30 ppm by mass or more, particularly preferably 50 ppm by mass or more. On the other hand, when the content of Fe is 500 ppm by mass or less, absorption of visible light during use of a wearable device is prevented, and the internal transmittance is enhanced. The content of Fe is preferably 300 ppm by mass or less, more preferably 250 ppm by mass or less, still more preferably 200 ppm by mass or less, yet still more preferably 100 ppm by mass or less, even yet still more preferably 50 ppm by mass or less, particularly preferably 30 ppm by mass or less.

Cr is a component that colors the glass, and this can be contained to obtain favorable chromaticity by increasing both a* and b*. The content of Cr is preferably 0.3 ppm by mass or more, more preferably 0.5 ppm by mass or more, still more preferably 1 ppm by mass or more, yet still more preferably 3 ppm by mass or more, particularly preferably 5 ppm by mass or more. On the other hand, when the content of Cr is 50 ppm by mass or less, absorption of visible light during use of a wearable device is prevented, and the internal transmittance is enhanced. The content of Cr is preferably 30 ppm by mass or less, more preferably 25 ppm by mass or less, still more preferably 20 ppm by mass or less, yet still more preferably 10 ppm by mass or less, even yet still more preferably 5 ppm by mass or less, particularly preferably 3 ppm by mass or less.

Ni is a component that colors the glass, and this can be contained to obtain favorable chromaticity by increasing b*. The content of Ni is preferably 0.3 ppm by mass or more, more preferably 0.5 ppm by mass or more, still more preferably 1 ppm by mass or more, yet still more preferably 3 ppm by mass or more, particularly preferably 5 ppm by mass or more. On the other hand, when the content of Ni is 50 ppm by mass or less, absorption of visible light during use of a wearable device is prevented, and the internal transmittance is enhanced. The content of Ni is preferably 30 ppm by mass or less, more preferably 25 ppm by mass or less, still more preferably 20 ppm by mass or less, yet still more preferably 10 ppm by mass or less, even yet still more preferably 5 ppm by mass or less, particularly preferably 3 ppm by mass or less.

Pt is a component that colors the glass, and this can be contained to obtain favorable chromaticity by increasing b*. The content of Pt is preferably 0.3 ppm by mass or more, more preferably 0.5 ppm by mass or more, still more preferably 1 ppm by mass or more, yet still more preferably 3 ppm by mass or more, particularly preferably 5 ppm by mass or more. On the other hand, when the content of Pt is 10 ppm by mass or less, absorption of visible light during use of a wearable device is prevented, and the internal transmittance is enhanced. The content of Pt is preferably 30 ppm by mass or less, more preferably 25 ppm by mass or less, still more preferably 20 ppm by mass or less, yet still more preferably 10 ppm by mass or less, even yet still more preferably 5 ppm by mass or less, particularly preferably 3 ppm by mass or less.

Furthermore, it is preferable that the optical glass of this embodiment contains at least one of $Sb_2O_3$ and $SnO_2$. These are not an essential component but can be added for the purpose of, for example, adjusting the refractive index property, enhancing the meltability, controlling coloration, increasing the transmittance, refining, and improving chemical durability. In the case where these components are contained, the content thereof is in total preferably 5% or less, more preferably 3% or less, still more preferably 1% or less, especially preferably 0.5% or less.

Second Embodiment

The optical glass in the second embodiment of the present invention has the same properties of the optical glass in the first embodiment in terms of having high refractive index ($n_d$) of 1.55 or more, and the properties related to its chromaticity slightly differ in the respects described below. The chromaticity is specified differently from the first embodiment, but these embodiments include many overlapping glasses.

Since the chromaticities a* and b* of the optical glass satisfy those properties, the color observed can be improved when stacked with the later-described dimmable member. More specifically, in the later-described optical member configured by stacking together the optical glass and the dimmable member, both chromaticities $a_C^*$ and $b_C^*$ under A light source in the CIELab representation when shielding the dimmable member from a light approximate 0, and the color when viewing an image, etc. through the optical member becomes natural color.

As for the chromaticity in this embodiment, the ratio (b*/|a*|) of b* to the absolute value of the chromaticity a* of the optical glass satisfies b*/|a*|≥0.55. Since the ratio satisfies b*/|a*|≥0.55, when the dimmable member is set in a light-shielded (colored) state, the color when viewing an image, etc. through an optical member configured by stacking together the optical glass and the dimmable member comes closer to natural color. The ratio is preferably b*/|a*|≥0.60, more preferably b*/|a*|≥0.70, still more preferably b*/|a*|≥0.80, yet still more preferably b*/|a*|≥1.00.

In addition to the above-described relationship, it is preferred that the chromaticity satisfies $b^* \geq 0.1$.

Figure 3:
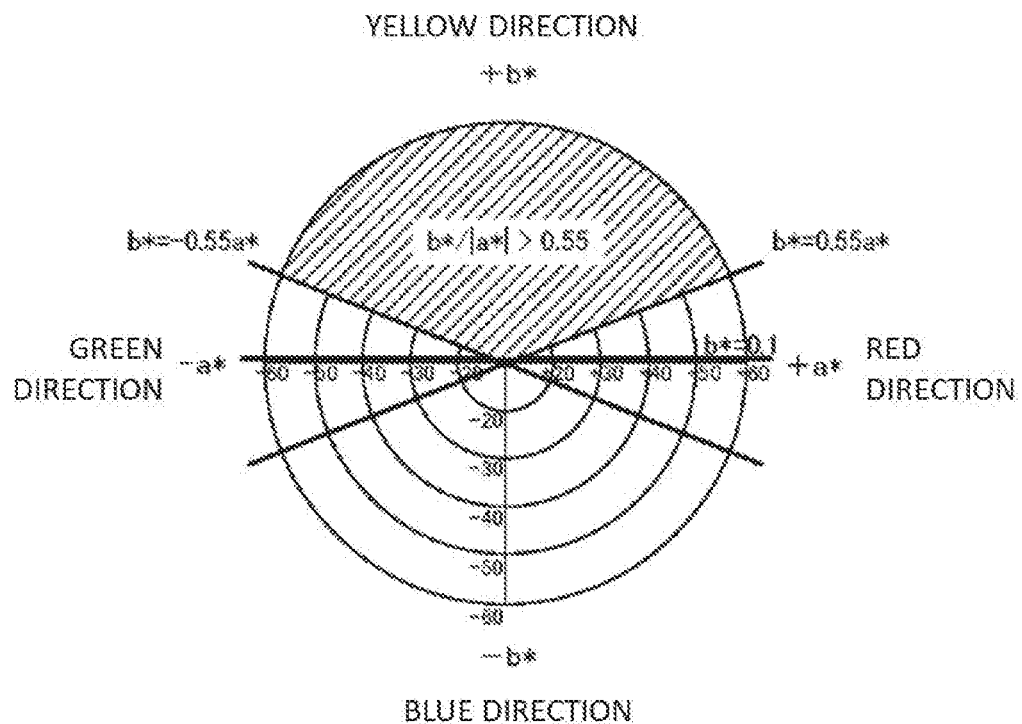
FIG. 3 is a diagram illustrating chromaticity range in chromaticity diagram with respect to the chromaticity of the optical glass in the second embodiment of the present invention.

With respect to the chromaticity of the optical glass, chromaticity diagram depicting the region satisfying the relationship above is illustrated in FIG. 3.

By virtue of satisfying the region in the chromaticity diagram described above, when the dimmable member is set in a light-shielded (colored) state, the color when viewing an image, etc. through an optical member configured by stacking together the optical glass and the dimmable member is not biased to a specific color and in addition, reduction in the luminosity when viewing the surrounding scenery, etc. can be prevented.

In the second embodiment, other physical properties and shape characteristics or the glass composition can be described as with the first embodiment. In order to satisfy the above-described chromaticity properties, it is preferable to contain Fe, Ni or Pt. The total of the contents of Fe, Ni and Pt is preferably 0.3 ppm by mass or more, more preferably 0.5 ppm by mass or more, still more preferably 1 ppm by mass or more, yet still more preferably 3 ppm by mass or more, particularly preferably 5 ppm by mass or more. On the other hand, when the total of the contents of Fe, Ni and Pt is 10 ppm by mass or less, absorption of visible light during use of a wearable device is prevented, and the internal transmittance is enhanced.

[Optical Glass and Production Method of Glass Molded Body]

The optical glass of the above embodiment is produced, for example, as follows.

First, raw materials are weighed to give the predetermined glass composition above and uniformly mixed. The obtained raw material mixture is charged into a continuous melting furnace and heated by burners to melt the raw material mixture and after homogenization by refining, stirring, etc., the melt is flowed out from the continuous melting furnace, cooled and solidified to obtain the optical glass of this embodiment.

Furthermore, the optical glass can be made into a glass plate by forming the molten glass into a plate shape by a known forming method such as float method, fusion method, and roll-out method. In addition, a glass molded body can be fabricated using means such as reheat press molding or precise press molding. More specifically, a lens preform for mold-press molding is fabricated from the optical glass, and this lens preform may be subjected to reheat press molding and then polishing to fabricate the glass molded product, or for example, the lens preform fabricated by polishing may be subjected to precise press molding to fabricate the glass molded product. The means to fabricate the glass molded product is not limited to these means.

As for the melting method, the continuous melting method described above is suitable, but other than this method, the optical glass may also be obtained by conventional known method. For example, a mixture obtained by mixing raw materials may be put in a platinum crucible, a quartz crucible or an alumina crucible and roughly melted. After that, the melt may be put in a gold crucible, a platinum crucible, a platinum alloy crucible, a reinforced platinum crucible or an iridium crucible, melted at a temperature ranging from 1,200 to 1,400° C. for 2 to 10 hours, homogenized by refining, stirring, etc. to effect foam breaking, etc., then cast on a metal mold, and slowly cooled to obtain the optical glass.

An optical member such as the thus-fabricated glass plate or glass molded body is useful for various optical elements and, among others, is suitably used for (1) wearable device, for example, glasses with projector, a glasses-type or goggle-type display, a light guide used for a virtual reality and augmented reality display device, a virtual image display device, etc., a filter, and a lens, and (2) a lens, a cover glass, etc. used for a vehicle-mounted camera or a robots' visual sensor. Even in applications exposed to severe environment, such as vehicle-mounted camera, the optical member is suitably used. The optical member is also suitably used for applications such as organic EL glass substrate, wafer level lens array substrate, lens unit substrate, lens forming substrate by an etching method, and optical waveguide.

The optical glass of this embodiment described hereinabove has high refractive index and a predetermined chromaticity and is suitable as an optical glass for wearable device, for vehicle mounting, and for robot mounting, in which the optical glass is used combining with a dimmable member.

Third Embodiment

[Optical Member]

The optical member of this embodiment is a member obtained with a configuration in which a dimmable member is stacked with the optical glass described above of this embodiment. The optical member obtained in this way includes, for example, an optical member 10 in which, as illustrated in FIG. 1, a dimmable member 12 is stacked on the optical glass 11. By thus stacking the dimmable member 12 on the optical glass 11, the transmittance of light in the optical member 10 can be arbitrarily adjusted. More specifically, the whole transmittance of the optical member can be arbitrarily varied by adjusting the light transmittance of the dimmable member 12. In FIG. 1, a laminated configuration is illustrated, but it is also possible to arrange the optical glass 11 and the dimmable member 12 with a spacing.

The dimmable member 12 used here is described blow. The optical glass 11 is described hereinabove, and its description is omitted.

<Dimmable Member>

The dimmable member 12 of this embodiment is a glass in which the chromaticity $b^*$ under A light source in the CIELab representation satisfies $b^* < 0$ when shielding the dimmable member from a light. Since $b^*$ at the time of light shielding satisfies this relationship, in the optical member 10 obtained by stacking together the dimmable member 12 and the optical glass 11 above, both chromaticities $a_C^*$ and $b_C^*$ under A light source in the CIELab representation at the time of light shielding more approximate 0 than in the case of the dimmable member 12 alone. Consequently, the color when viewing an image through the optical member 10 becomes natural color. The chromaticity $b^*$ of the dimmable member 12 is preferably $b^* < -1$, more preferably $b^* < -2$, still more preferably $b^* < -4$, especially preferably $b^* < -6$.

The chromaticity $b^*$ of the dimmable member 12 is preferably $b^* > -15$. Since the chromaticity $b^*$ satisfies $b^* > -15$, when the dimmable member 12 is set in a light-shielded (colored) state, the color when viewing an image, etc. through the optical member 10 configured by stacking together the optical glass 11 above and the dimmable member 12 comes closer to natural color. The chromaticity $b^*$ of the dimmable member 12 is preferably $b^* > -10$, more preferably $b^* > -8.0$, still more preferably $b^* > -7.0$, yet still more preferably $b^* > -6.0$.

The dimmable member in this embodiment can be formed to consist of a first substrate, a second substrate opposing the first substrate, a first electrode and a second electrode provided on the first substrate and the second substrate, respectively, and a light transmission control material layer sealed between the first substrate and a second substrate.

As such a dimmable member 12, a known dimmable member 12 satisfying the relationship related to the chromaticity b* when shielding the dimmable member from a light is preferred.

Examples of the known dimmable member include a dimmable member configured, for example, by including a first substrate, a second substrate opposing the first substrate, and a light transmission control material layer sealed between the first substrate and the second substrate.

In the dimmable member, examples of the light transmission control material layer include (1) a liquid crystal material layer, (2) an inorganic electroluminescence material layer, (3) an electrophoretic dispersion liquid layer composed of many charged electrophoretic particles and a dispersion medium having a color different from that of the electrophoretic particles, (4) an electrodeposition method (electrodeposition•electric field deposition) material layer utilizing an electrodeposition•dissociation phenomenon generated by a reversible oxidation-reduction reaction of a metal (for example, a silver particle), (5) an electrochromic material layer utilizing a color change of a substance generated by an oxidation-reduction reaction, and (6) an electrowetting material layer that controls a light transmittance by an electrowetting phenomenon.

In the case of the (2) inorganic electroluminescence material layer, the material constituting the light transmission control material layer includes an organic type, a tungsten type, etc. Such a dimmable member exhibits a bluish color tone when shielding the dimmable member from a light. This dimmable member 12 includes, for example, Automatic-dimmable mirror of Gentex, EC Glass (auto-dimmable) of Magna Mirror, Sage Glass of SAGE, and Hailo of Kinestral.

It is preferable to arrange the optical glass and the dimmable member in this order from the observer side, but these may be arranged in the order of the dimmable member and the optical glass.

The optical member 10 of this embodiment is used by stacking together the above-described optical glass 11 and dimmable member 12, and by being used in such a stacked manner, the color of an image, etc. observed in a light-shielded (colored) state can be recognized as natural color.

In the optical member 10 of this embodiment, when $a_C^*$ and $b_C^*$ are denoted as the chromaticities of a configuration (optical member 10) in which the optical glass 11 and the dimmable member 12 are stacked together, it is preferred that $|a_C^*| \leq 3.1$. Within this range, the color of an image, etc. observed by means of the optical member 10 comes closer to natural color. The chromaticity of the chromaticity $a_C^*$ structure is preferably $|a_C^*| \leq 2.9$, more preferably $|a_C^*| \leq 2.7$, still more preferably $|a_C^*| \leq 2.5$, especially preferably $|a_C^*| \leq 2.4$.

In the optical member 10 of this embodiment, it is preferred that $|b_C^*| \leq 4.9$. Within this range, the color of an image, etc. observed by means of the optical member 10 comes closer to natural color. The chromaticity of the optical member 10 is preferably $|b_C^*| \leq 4.6$, more preferably $|b_C^*| \leq 4.3$, still more preferably $|b_C^*| \leq 4$, especially preferably $|b_C^*| \leq 3.5$.

In the optical member 10 of this embodiment, it is preferred that the chromaticities $a_C^*$ and $b_C^*$ satisfy the following relational expression (1):

[Math. 1]

$$\sqrt{a_C^{*2}+b_C^{*2}} \leq 5.9 \qquad (1)$$

Within this range, the color of the outside world when viewing the outside world through the structure becomes natural color. The relational expression (1) of chromaticities is preferably 5.7 or less, more preferably 5.5 or less, still more preferably 5 or less, especially preferably 4 or less.

The relational expression (1) of chromaticities is preferably 0.1 or more. When the relational expression (1) of chromaticities is 0.1 or more, the hazards of ultraviolet light to the eye can be reduced. The relational expression (1) of chromaticities is preferably 0.3 or more, more preferably 0.5 or more, especially preferably 1.0 or more.

Figure 4:
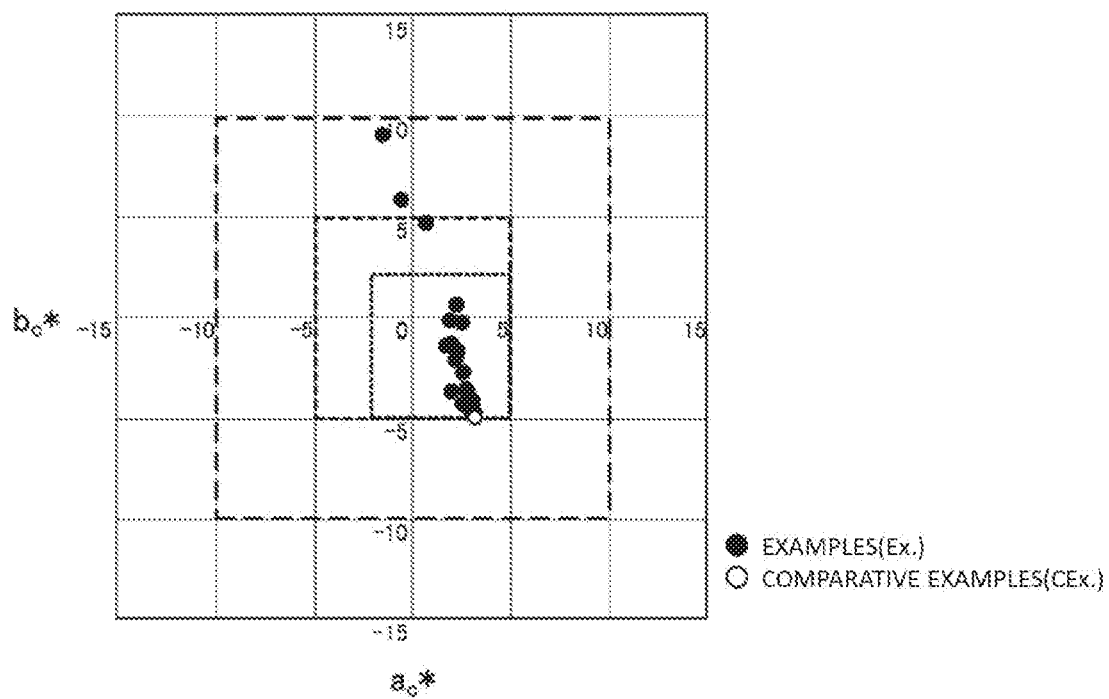
FIG. 4 is a partially enlarged diagram plotting, on chromaticity diagram, the chromaticity of the optical members obtained in Working Example and Comparative Example.

In the optical member of this embodiment, it is preferred that the chromaticity under A light source in the CIELab representation when shielding the dimmable member from a light of the dimmable member is included in the region surrounded by the point 1 where $a_C^*=10$ and $b_C^*=10$, the point 2 where $a_C^*=10$ and $b_C^*=-10$, the point 3 where $a_C^*=-10$ and $b_C^*=-10$, and the point 4 where $a_C^*=-10$ and $b_C^*=10$. When the chromaticity of the optical member is in the region surrounded by these four points, the color when viewing an image, etc. through the optical member 10 configured by stacking together the above-described optical glass 11 and dimmable member 12 comes closer to natural color. The point 1 is more preferably ($a_C^*=5$ and $b_C^*=5$), still more preferably ($a_C^*=5$ and $b_C^*=2.5$). The point 2 is more preferably ($a_C^*=5$ and $b_C^*=-5$). The point 3 is more preferably ($a_C^*=-5$ and $b_C^*=-5$), still more preferably ($a_C^*=-2.5$ and $b_C^*=-5$). The point 4 is more preferably ($a_C^*=-5$ and $b_C^*=5$), still more preferably ($a_C^*=-2.5$ and $b_C^*=-2.5$). In FIG. 4, a region where the square formed by connecting four points is quadrate in shape is illustrated, but the four points may also be selected to surround ($a_C^*=0$ and $b_C^*=0$).

Although FIG. 1 illustrates an example where an optical glass 11 and a dimmable member 12 having the same size are stacked one on top of another, it is also possible to provide the dimmable member 12 on a part of the optical glass 11 or provide the optical glass 12 on a part of the dimmable member 12.

Examples of the material constituting the first substrate and second substrate used in the dimmable member of this embodiment include, specifically, a transparent glass substrate such as soda lime glass and white sheet glass, a plastic substrate, a plastic sheet, and a plastic film. Here, examples of the plastic include, for example, polyethylene terephthalate, polyethylene naphthalate, polycarbonate, a cellulose ester such as cellulose acetate, a fluoropolymer such as a copolymer of polyvinylidene fluoride or polytetrafluoroethylene and hexafluoropropylene, a polyether such as polyoxymethylene, a polyolefin such as polyacetal, polystyrene, polyethylene, polypropylene and methylpentene polymer, a polyimide such as polyamideimide and polyetherimide, polyamide, polyethersulfone, polyphenylene sulfide, polyvinylidene fluoride, tetraacetyl cellulose, brominated phenoxy, polyarylate, and polysulfone. The plastic sheet and plastic film may be rigid and not easily bent or may be flexible. In the case of forming the first substrate and second substrate from a transparent plastic substrate, a barrier layer composed of an inorganic material or organic material may be formed on an inner surface of the substrate.

The first substrate and second substrate of the dimmable member of this embodiment preferably have a thickness of 0.01 mm or more. When the thickness is 0.01 mm or more, breakage during handling or processing of the dimmable member can be prevented. In addition, deflection due to its own weight of the optical glass can be reduced. The thickness is more preferably 0.1 mm or more, still more preferably 0.3 mm or more, yet still more preferably 0.5 mm or more, particularly preferably 0.7 mm or more. On the other hand, when the thickness is 2.0 mm or less, each of the transmitting state and the colored state can be favorably varied by dimmable. The thickness is more preferably 1.5 mm or less, still more preferably 1.0 mm or less, yet still more preferably 0.8 mm or less, particularly preferably 0.6 mm or less.

Fourth Embodiment

[Optical Device]

The optical device of this embodiment uses the optical member of this embodiment.

The optical device includes (1) a display, a filter, a lens, etc. used in the above-described wearable device such as glasses with projector, glasses-type or goggle-type display, virtual reality and augmented reality display device and virtual image display device, and (2) a lens, a cover glass, etc. used, for example, in an in-vehicle camera or a robotic vision sensor.

Figure 2:
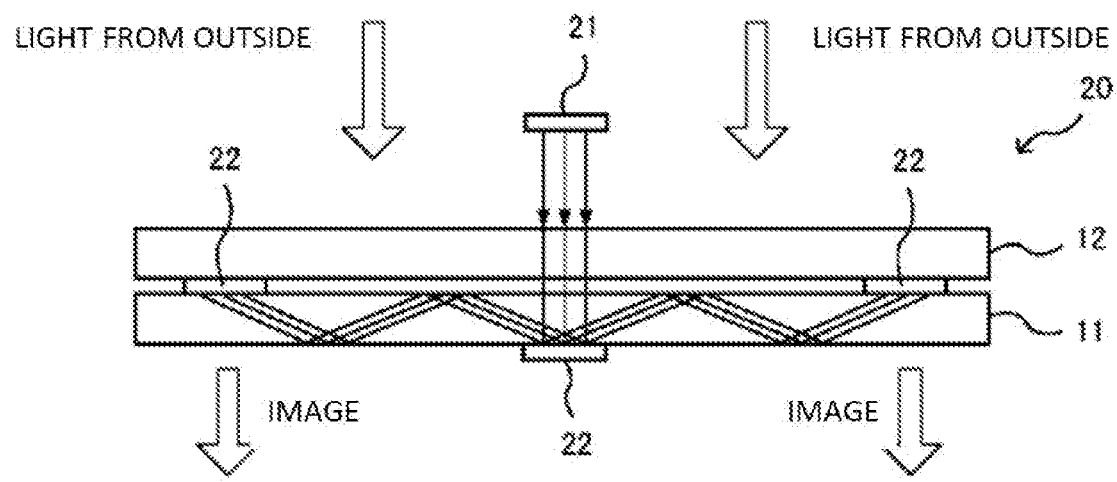
FIG. 2 is a diagram for explaining the configuration and function when the optical member of the present invention is applied to a head-mounted display.

As an example of the wearable device, a schematic configuration of an optical device 20 capable of applying the optical member 10 to a head-mounted display or a goggle-type display is illustrated in FIG. 2. The optical device 20 is the same as the optical member 10 illustrated in FIG. 1 in terms of stacking together the optical glass 11 and the dimmable member 12 but, here, has a display element 21 for displaying an image and a propagation unit 22 for letting the image displayed on the display element 21 be incident on the optical glass 11 through the dimmable member 12 and totally reflecting the incident image inside the optical glass 11 to propagate it to the eye pupil of a person wearing the optical device 20.

The display element 21 is an element for displaying an image, and the displayed image is caused to be incident on the optical glass 11 through the dimmable member 12. At this time, the display element 21 may have a backlight.

The display element and the propagation unit are arranged such that the image incident on the optical glass 11 is diffracted so as to propagate to a predetermined position while being totally reflected within the optical glass 11 by the propagation unit 22 and furthermore, the image propagated to a predetermined position is diffracted toward the eye pupil of a person wearing the optical device 20.

At this time, in the case of bright environment such as outdoors, since the outside light is strong, the image is sometimes less visible. In such a case, in the optical device 20 of this embodiment, the dimmable member 12 can be set in a light-shielded state to reduce the effect of the outside light and make the image easily visible. On that occasion, furthermore, the color perceived through the optical glass 11 and the dimmable member 12 is improved as described above, and an image closer to the original color can therefore be viewed.

The light transmitting state of the dimmable member 12 may be arbitrarily adjusted by the user or may be automatically adjusted by sensing the strength of the outside light by a sensor, etc., or these may be combined.

Examples

As the raw materials, high-purity raw materials usually used in an optical glass, such as oxide, hydroxide, carbonate, nitrate, fluoride, hydroxide and metaphosphoric acid compound, are selected and used.

Weighed raw materials were uniformly mixed, put in a platinum crucible, melted at about 1,400° C. for about 5 hours, refined, stirred, then cast on a rectangular mold of 50 mm (length)×100 mm (width) preheated at approximately 650° C., and slowly cooled at about 1° C./min to obtain an optical glass having a predetermined plate thickness of each of Examples 1 to 28 and Comparative Example 1.

Examples 1 to 5, 7 to 8, 14 and 22 used a Si—Nb-based glass containing $SiO_2$ and $Nb_2O_5$ as main components, Examples 6, 11, 15 to 17, 20 and 23 to 25 used a Si—Ti-based glass containing $SiO_2$ and $TiO_2$ as main components, Examples 9, 10, 18 and 19 used a La—B-based glass containing $La_2O_3$ and $B_2O_3$ as main components, Examples 12, 13 and 21 used a P-based glass containing $P_2O_5$ as a main component, Examples 26 to 28 used a Bi-based glass containing $Bi_2O_3$ as a main component, and Comparative Example 1 used a Si—Al-based glass containing $SiO_2$ and $Al_2O_3$ as main components. In order to adjust the chromaticity, assuming the total of constituent components of the base glass is 100 mass %, Fe, Cr, Ni and Pt were contained as an element working out to a colored component as shown in Tables 1 to 4.

Subsequently, the obtained optical glass was stacked with a dimmable member (be*=−5.2) of ALTEOS (registered trademark) Interactive Window Systems of Gentex-PPG to obtain an optical member of each of Examples 1 to 28 and Comparative Example 1.

[Properties]

The optical glass obtained above was measured for the glass transition temperature (Tg), coefficient of thermal expansion (α), Young's modulus (E), refractive index ($n_d$), transmittance, and chromaticity as follows. The optical member was measured for the chromaticity as follows. The obtained results are shown together in Tables 1 to 4.

Glass Transition Temperature (Tg):

This is a value measured using a differential dilatometer (TMA) and was determined according to JIS R3103-3 (2001).

Coefficient of Thermal Expansion (α):

Linear coefficients of thermal expansion in the range of 30 to 350° C. were measured using a differential dilatometer (TMA), and an average linear coefficient of thermal expansion in the range of 30 to 350° C. was determined according to JIS R3102 (1995).

Young's Modulus (E):

A plate-shaped sample of 20 mm×20 mm×1 mm was measured using an ultrasonic precision thickness gauge (manufactured by OLYMPUS Corporation, MODEL 38DL PLUS) (unit: GPa).

Refractive Index ($n_d$):

The sample glass was processed into a triangle-shaped prism having a thickness of 10 mm with one side being 30 mm and measured by a refractometer (manufactured by Kalnew Corporation, device name: KPR-2000).

Transmittance:

A sample obtained by processing the optical glass into a plate shape having the thickness described in Examples and mirror-polishing both surfaces was measured by a spectrophotometer (manufactured by Hitachi High-Technologies Corporation, U-4100).

Chromaticity:

As the chromaticity, the luminosity (L*) in A light source and the chromaticity (a*, b*) in A light source were measured (JIS Z 8781-4 (2013)) using the CIE 1976 (L*a*b*) color space (CIELAB) standardized by the Commission International de l'Eclairage (CIE).

TABLE 1

| | | Example | | | | | | |
|---|---|---|---|---|---|---|---|---|
| | | 1 | 2 | 3 | 4 | 5 | 6 | 7 |
| Optical glass | Type of glass | Si—Nb-based | Si—Nb-based | Si—Nb-based | Si—Nb-based | Si—Nb-based | Si—Ti-based | Si—Nb-based |
| | Glass transition temperature (° C.) | 590 | 590 | 590 | 590 | 590 | 680 | 590 |
| | Coefficient of thermal expansion ($\times 10^{-7}$/° C.) | 81 | 81 | 81 | 81 | 81 | 83 | 81 |
| | Young's modulus (GPa) | 99 | 99 | 99 | 99 | 99 | 94 | 99 |
| | Refractive index | 1.78 | 1.78 | 1.78 | 1.78 | 1.78 | 1.70 | 1.78 |
| | Plate thickness (mm) | 10 | 10 | 10 | 10 | 1 | 0.5 | 10 |
| | Coloring element (ppm by mass) Fe | 2.2 | 2.2 | 2.4 | 4.0 | 2.4 | 12.0 | 200.0 |
| | Cr | 5.0 | 0.0 | 0.0 | 1.1 | 0.0 | 0.0 | 0.0 |
| | Ni | 0.0 | 5.0 | 0.0 | 0.6 | 0.0 | 0.0 | 0.0 |
| | Pt | 5.3 | 5.5 | 5.1 | 0.0 | 5.1 | 0.0 | 5.1 |
| | Transmittance (%) 450 nm | 78.4 | 79.0 | 81.1 | 82.9 | 84.5 | 86.7 | 72.8 |
| | 550 nm | 84.0 | 84.9 | 85.0 | 85.3 | 85.6 | 87.4 | 83.5 |
| | 650 nm | 83.6 | 86.0 | 85.9 | 85.3 | 85.9 | 87.5 | 86.0 |
| | 750 nm | 84.9 | 86.2 | 86.1 | 85.9 | 86.1 | 87.7 | 86.2 |
| | Chromaticity $\sqrt{a^{*2}+b^{*2}}$ | 11.5 | 12.0 | 11.1 | 10.2 | 9.9 | 9.9 | 14.9 |
| | a* | 7.4 | 7.6 | 7.9 | 8.1 | 8.4 | 8.6 | 7.6 |
| | b* | 8.7 | 9.3 | 7.7 | 6.2 | 5.3 | 4.9 | 12.8 |
| | b*/\|a*\| | 1.18 | 1.21 | 0.98 | 0.76 | 0.63 | 0.57 | 1.67 |
| Chromaticity of optical member | $\sqrt{a_C^{*2}+b_C^{*2}}$ | 3.1 | 2.9 | 3.8 | 4.7 | 5.4 | 5.7 | 2.3 |
| | $a_C^*$ | 2.3 | 2.4 | 2.6 | 2.8 | 3.1 | 3.2 | 2.2 |
| | $b_C^*$ | -2.0 | -1.7 | -2.7 | -3.8 | -4.4 | -4.7 | 0.6 |

TABLE 2

| | | Example | | | | | | |
|---|---|---|---|---|---|---|---|---|
| | | 8 | 9 | 10 | 11 | 12 | 13 | 14 |
| Optical glass | Type of glass | Si—Nb-based | La—B-based | La—B-based | Si—Ti-based | P-based | P-based | Si—Nb-based |
| | Glass transition temperature (° C.) | 590 | 655 | 655 | 680 | 372 | 372 | 589 |
| | Coefficient of thermal expansion ($\times 10^{-7}$/° C.) | 81 | 73 | 73 | 83 | 151 | 151 | 85 |
| | Young's modulus (GPa) | 99 | 129 | 129 | 94 | 80 | 80 | 98 |
| | Refractive index | 1.78 | 1.77 | 1.77 | 1.70 | 1.55 | 1.55 | 1.76 |
| | Plate thickness (mm) | 1 | 10 | 10 | 10 | 10 | 10 | 10 |
| | Coloring element (ppm by mass) Fe | 200.0 | 100.0 | 1.3 | 100.0 | 100.0 | 1.1 | 2.5 |
| | Cr | 0.0 | 0.0 | 10.0 | 0.0 | 0.0 | 10.0 | 10.0 |
| | Ni | 0.0 | 0.0 | 0.0 | 0.0 | 0.0 | 0.0 | 0.0 |
| | Pt | 5.1 | 3.0 | 3.0 | 3.0 | 1.0 | 1.0 | 5.0 |
| | Transmittance (%) 450 nm | 84.0 | 80.0 | 79.1 | 73.7 | 90.6 | 87.6 | 78.7 |
| | 550 nm | 85.7 | 85.5 | 82.3 | 82.7 | 91.3 | 90.3 | 85.0 |
| | 650 nm | 86.4 | 85.7 | 81.2 | 84.9 | 91.2 | 88.6 | 83.7 |
| | 750 nm | 86.6 | 84.8 | 83.7 | 85.5 | 91.2 | 90.4 | 85.7 |
| | Chromaticity $\sqrt{a^{*2}+b^{*2}}$ | 10.2 | 11.8 | 9.2 | 13.9 | 9.9 | 9.6 | 11.4 |
| | a* | 8.5 | 6.9 | 6.8 | 8.0 | 8.5 | 7.7 | 7.3 |
| | b* | 5.7 | 9.6 | 6.1 | 11.4 | 5.0 | 5.7 | 8.7 |
| | b*/\|a*\| | 0.68 | 1.39 | 0.90 | 1.43 | 0.58 | 0.73 | 1.19 |
| Chromaticity of optical member | $\sqrt{a_C^{*2}+b_C^{*2}}$ | 5.1 | 2.3 | 4.2 | 2.6 | 5.7 | 5.0 | 3.1 |
| | $a_C^*$ | 3.1 | 1.8 | 2.0 | 2.5 | 3.1 | 2.6 | 2.2 |
| | $b_C^*$ | -4.1 | -1.5 | -3.7 | -0.3 | -4.8 | -4.3 | -2.1 |

TABLE 3

| | | Example | | | | | | |
|---|---|---|---|---|---|---|---|---|
| | | 15 | 16 | 17 | 18 | 19 | 20 | 21 |
| Optical glass | Type of glass | Si—Ti-based | Si—Ti-based | Si—Ti-based | La—B-based | La—B-based | Si—Ti-based | P-based |
| | Glass transition temperature (° C.) | 658 | 627 | 660 | 655 | 655 | 680 | 372 |
| | Coefficient of thermal expansion ($\times 10^{-7}$/° C.) | 95 | 91 | 75 | 73 | 73 | 83 | 151 |
| | Young's modulus (GPa) | 87 | 119 | 120 | 129 | 129 | 94 | 80 |
| | Refractive index | 1.73 | 1.80 | 1.90 | 1.77 | 1.77 | 1.70 | 1.55 |
| | Plate thickness (mm) | 10 | 10 | 10 | 1 | 1 | 1 | 1 |

TABLE 3-continued

|  |  | Example | | | | | | |
|---|---|---|---|---|---|---|---|---|
|  |  | 15 | 16 | 17 | 18 | 19 | 20 | 21 |
| Coloring element (ppm by mass) | Fe | 100.0 | 36.0 | 58.0 | 100.0 | 1.3 | 100.0 | 1.1 |
|  | Cr | 0.0 | 0.0 | 0.0 | 0.0 | 10.0 | 0.0 | 10.0 |
|  | Ni | 0.0 | 0.0 | 0.0 | 0.0 | 0.0 | 0.0 | 0.0 |
|  | Pt | 3.0 | 3.0 | 3.0 | 3.0 | 3.0 | 3.0 | 1.0 |
| Transmittance (%) | 450 nm | 76.1 | 77.5 | 63.7 | 85.0 | 84.5 | 85.0 | 90.7 |
|  | 550 nm | 85.1 | 84.1 | 80.0 | 85.8 | 85.2 | 86.5 | 91.3 |
|  | 650 nm | 86.1 | 84.7 | 82.4 | 86.0 | 85.2 | 86.9 | 91.1 |
|  | 750 nm | 85.7 | 85.2 | 83.1 | 86.0 | 85.6 | 87.3 | 91.5 |
| Chromaticity | $\sqrt{a^{*2}+b^{*2}}$ | 13.6 | 12.2 | 19.4 | 9.8 | 9.6 | 10.1 | 9.8 |
|  | $a^*$ | 7.1 | 7.2 | 5.7 | 8.3 | 8.3 | 8.5 | 8.6 |
|  | $b^*$ | 11.6 | 9.8 | 18.6 | 5.2 | 4.8 | 5.5 | 4.8 |
|  | $b^*/|a^*|$ | 1.62 | 1.37 | 3.23 | 0.62 | 0.58 | 0.65 | 0.56 |
| Chromaticity of optical member | $\sqrt{a_C^{*2}+b_C^{*2}}$ | 1.9 | 2.4 | 4.7 | 5.4 | 5.6 | 5.3 | 5.8 |
|  | $a_C^*$ | 1.9 | 2.0 | 0.7 | 3.0 | 3.0 | 3.1 | 3.1 |
|  | $b_C^*$ | -0.2 | -1.3 | 4.6 | -4.5 | -4.7 | -4.3 | -4.9 |

TABLE 4

|  |  | Example | | | | | | | Comparative Example |
|---|---|---|---|---|---|---|---|---|---|
|  |  | 22 | 23 | 24 | 25 | 26 | 27 | 28 | 1 |
| Optical glass | Type of glass | Si—Nb-based | Si—Ti-based | Si—Ti-based | Si—Ti-based | Bi-based | Bi-based | Bi-based | Si—Al-based |
|  | Glass transition temperature (° C.) | 589 | 658 | 627 | 660 | 417 | 485 | 485 | 633 |
|  | Coefficient of thermal expansion (×10⁻⁷/° C.) | 85 | 95 | 91 | 75 | 111 | 104 | 104 | 89 |
|  | Young's modulus (GPa) | 98 | 87 | 119 | 120 |  |  |  | 73 |
|  | Refractive index | 1.76 | 1.73 | 1.80 | 1.90 | 2.12 | 2.00 | 2.00 | 1.51 |
|  | Plate thickness (mm) | 1 | 1 | 1 | 1 | 10 | 10 | 10 | 0.7 |
| Coloring element (ppm by mass) | Fe | 2.5 | 100.0 | 36.0 | 58.0 | 30.0 | 30.0 | 20.0 | 30.0 |
|  | Cr | 10.0 | 0.0 | 0.0 | 0.0 | 0.0 | 0.0 | 0.0 | 0.0 |
|  | Ni | 0.0 | 0.0 | 0.0 | 0.0 | 0.0 | 0.0 | 0.0 | 0.0 |
|  | Pt | 5.0 | 3.0 | 3.0 | 3.0 | 4.0 | 5.0 | 6.0 | 0.0 |
| Transmittance (%) | 450 nm | 84.5 | 86.3 | 83.1 | 80.4 | 73.1 | 63.8 | 59.0 | 92.1 |
|  | 550 nm | 85.8 | 87.2 | 84.4 | 82.9 | 74.4 | 77.5 | 78.0 | 92.4 |
|  | 650 nm | 85.9 | 87.2 | 84.7 | 83.4 | 74.6 | 78.9 | 79.6 | 92.3 |
|  | 750 nm | 86.4 | 87.5 | 85.0 | 83.7 | 74.9 | 80.3 | 80.8 | 92.4 |
| Chromaticity | $\sqrt{a^{*2}+b^{*2}}$ | 9.9 | 9.8 | 9.9 | 10.3 | 9.5 | 20.2 | 24.7 | 9.9 |
|  | $a^*$ | 8.4 | 8.5 | 8.3 | 8.1 | 8.0 | 4.1 | 3.0 | 8.7 |
|  | $b^*$ | 5.3 | 5.0 | 5.4 | 6.4 | 5.2 | 19.7 | 24.5 | 4.7 |
|  | $b^*/|a^*|$ | 0.63 | 0.60 | 0.64 | 0.79 | 0.64 | 4.78 | 8.10 | 0.54 |
| Chromaticity of optical member | $\sqrt{a_C^{*2}+b_C^{*2}}$ | 5.4 | 5.5 | 5.3 | 4.5 | 5.1 | 5.8 | 9.1 | 6.0 |
|  | $a_C^*$ | 3.1 | 3.1 | 3.0 | 2.8 | 2.9 | -0.5 | -1.4 | 3.2 |
|  | $b_C^*$ | -4.4 | -4.6 | -4.3 | -3.6 | -4.1 | 5.8 | 9.0 | -5.0 |

In all of the optical glasses of Examples 1 to 28, the refractive index ($n_d$) is as high a refractive index as 1.55 or more. In addition, in these optical glasses, the chromaticity $b^*$ is 4.8 or more or $b^*/|a^*|$ is 0.55 or more, and the optical glass is suitable for an optical member used in a wearable device, an in-vehicle camera or robot vision. Furthermore, in the optical glasses of Examples 1 to 26, the chromaticity $|b_C^*|$ of the optical member obtained by stacking with a dimmable member is 4.9 or less, and the value of relational expression (1) using $a_C^*$ and $b_C^*$ is 5.9 or less. Accordingly, the optical member is suitable as an optical member used in a wearable device, an in-vehicle camera or robot vision.

On the other hand, in the optical glass of Comparative Example 1, which is a comparative example, the chromaticity $b^*$ is less than 4.8 and $b^*/|a^*|$ is less than 0.55. Consequently, the chromaticity $|b_C^*|$ of the optical member formed is more than 4.9, and as the optical member for the applications above, it is difficult to recognize natural color.

Furthermore, a graph plotting the relationship of the chromaticities $a^*$ and $b^*$ under A light source in Examples and Comparative Examples is depicted in FIG. 4, and all of the optical glasses of Examples satisfy the predetermined ranges.

As understood from these results, the optical member of the Examples includes an optical glass having high refractive index and at the same time, the chromaticity $b^*$ thereof satisfies a predetermined range, revealing that the optical member is suitable as an optical member, for example, used in a wearable device, mounted on a car, or mounted on a robot.

REFERENCE SIGNS LIST

10: Optical member, 11: optical glass, 12: dimmable member, 20: optical device, 21: display element, 22: propagation unit.

The invention claimed is:

1. An optical glass having refractive index of 1.70 or more, wherein ratio ($b^*/|a^*|$) of chromaticity $b^*$ to absolute value of chromaticity a* satisfies $|b^*/|a^*||\geq 0.55$ under an A light source in a CIELab representation, and $15\geq b^*\geq 4.8$ is satisfied for b* under the A light source in the CIELab representation, and wherein the optical glass contains 60 mass % or less of $SiO_2$.

2. The optical glass according to claim 1, wherein all of light transmittances at wavelengths of 450 nm, 550 nm, 650 nm and 750 nm are 70% or more.

3. An optical member having a configuration in which the optical glass according to claim 1 and a dimmable member are stacked together.

4. The optical member according to claim 3, wherein chromaticity be* of the dimmable member satisfies be*<0 under the A light source in the CIELab representation.

5. The optical member according to claim 3, wherein chromaticity $a_C^*$ of the optical member satisfies $|a_C^*|\leq 3.1$ under the A light source in the CIELab representation.

6. The optical member according to claim 3, wherein chromaticity $b_C^*$ of the optical member satisfies $|b_C^*|\leq 4.9$ under the A light source in the CIELab representation.

7. The optical member according to claim 3, wherein chromaticity $a_C^*$ and chromaticity $b_C^*$ of the optical member satisfy the following relationship (1) under the A light source in the CIELab representation:

$$\sqrt{a_C^{*2}+b_C^{*2}}\leq 5.9 \qquad (1).$$

8. The optical member according to claim 3, wherein chromaticity of the optical member under the A light source in the CIELab representation is included in a region surrounded by the point 1 where $a_C^*=10$ and $b_C^*=10$, the point 2 where $a_C^*=10$ and $b_C^*=-10$, the point 3 where $a_C^*=-10$ and $b_C^*=-10$, and the point 4 where $a_C^*=-10$ and $b_C^*=10$.

9. An optical device comprising the optical member according to claim 3 and a display element.

* * * * *

UNITED STATES PATENT AND TRADEMARK OFFICE
CERTIFICATE OF CORRECTION

PATENT NO. : 11,852,815 B2
APPLICATION NO. : 16/876523
DATED : December 26, 2023
INVENTOR(S) : Shinichi Amma and Tatsuo Nagashima It is certified that error appears in the above-identified patent and that said Letters Patent is hereby corrected as shown below:

In the Claims

In Claim 1, Column 25, Line 2, please delete "Alight"; and insert with --A light--

In Claim 1, Column 25, Line 3, please delete "Alight"; and insert with --A light--

In Claim 5, Column 25, Line 17, please delete "Alight"; and insert with --A light--

Signed and Sealed this
Twenty-third Day of April, 2024

Katherine Kelly Vidal
*Director of the United States Patent and Trademark Office*